United States Patent [19]

Kaye

[11] Patent Number: 5,199,535
[45] Date of Patent: Apr. 6, 1993

[54] ACCELERATION-SENSITIVE FRICTION DEVICE

[75] Inventor: Arthur Kaye, Preston, United Kingdom

[73] Assignee: British Aerospace PLC, London, United Kingdom

[21] Appl. No.: 741,948

[22] Filed: Aug. 8, 1991

Related U.S. Application Data

[63] Continuation-in-part of Ser. No. 503,624, Apr. 3, 1990, abandoned.

[30] Foreign Application Priority Data

Apr. 10, 1989 [GB] United Kingdom ............... 8908012

[51] Int. Cl.⁵ ............................................. B60T 7/12
[52] U.S. Cl. ..................................... 188/135; 188/139; 188/181 A; 244/234
[58] Field of Search .................. 188/181 A, 177, 178, 188/135, 136, 139; 244/220, 221, 223, 224, 234

[56] References Cited

U.S. PATENT DOCUMENTS

| | | | |
|---|---|---|---|
| 1,138,902 | 5/1915 | Smith ................................. | 188/136 |
| 1,378,824 | 5/1921 | Parnell, Jr. . | |
| 3,485,327 | 12/1969 | Gudmundsen ..................... | 188/136 |
| 3,722,824 | 3/1973 | Hayashi .......................... | 188/135 X |
| 3,838,831 | 10/1974 | Bell .................................. | 188/139 X |
| 4,103,842 | 8/1978 | Martin et al. .................... | 188/139 X |
| 4,195,795 | 4/1980 | Ardizio .............................. | 188/136 |
| 4,477,043 | 10/1984 | Repperger .......................... | 244/223 |
| 4,726,627 | 2/1988 | Frait et al. ................... | 188/181 A X |

FOREIGN PATENT DOCUMENTS

| | | |
|---|---|---|
| 2050105 | 4/1972 | Fed. Rep. of Germany ...... 188/177 |
| 2222572 | 10/1974 | France . |
| 2073887 | 10/1981 | United Kingdom . |

Primary Examiner—Robert J. Oberleitner
Assistant Examiner—Peter M. Poon
Attorney, Agent, or Firm—Kerkam, Stowell, Kondracki & Clarke

[57] ABSTRACT

To eliminate undesired movement of control members, e.g. throttle control levers, subjected to high fore-and-aft accelerations, a mechanism is proposed in which brake pads (229), (231) bearing on a control surface (220) forming part of the control member are connected by a pivoted lever arrangement (203) to a pendulum (200). Oscillations of the pendulum due for fore-and-aft 'g' forces cause a proportional displacement of the lever arrangement (203) which in turn causes one or other of the brake pads (229, 231) to apply a correspondingly greater frictional force to the control surface (220).

14 Claims, 5 Drawing Sheets

ACCELERATION-SENSITIVE FRICTION DEVICE

This application is a continuation-in-part of Ser. No. 07/503,624 filed Apr. 3, 1990.

This invention concerns an acceleration-sensitive friction device for damping undesired acceleration-induced movements of a control member. Although it is not so restricted, the invention will hereafter be described with reference to a useful application thereof wherein the control member is a throttle lever or a throttle lever box of a rectilinearly activated aircraft throttle and a pendulum forming part of the device is mounted for oscillation about a horizontal axis so as to be sensitive to fore-and-aft accelerations.

A problem with existing aircraft throttle control levers is that they may be moved unintentionally by high 'g' forces. The present invention seeks to overcome this problem by the provision of a relatively simple device which may be retrofitted to existing aircraft or incorporated into new aircraft and which is effective to reduce or prevent undesired or uncommanded movement of e.g. linear throttle control levers of military aircraft subjected to high fore-and-aft accelerations.

According therefore to one non-exclusive aspect of the present invention, there is provided an acceleration-sensitive friction device for damping undesired acceleration-induced movements of a control member, comprising:

a bearing;

a pendulum mounted for oscillation in said bearing about an axis so as to be bi-directionally sensitive to longitudinal 'g' forces;

an element which is displaceable as a function of the amplitude of pendulum movement and which is one of: a part of said bearing, and a discrete part connected to said bearing;

at least two braking members disposed one on each side of said axis; each braking member being:

(i) connected to said element such that in use an increase in said amplitude is effective to vary the displacement of said element; and (ii) adapted frictionally to engage a surface of said control member with a frictional force, the magnitude of which is functionally related to the displacement of said element and thus to the increase, in either longitudinal direction, of said amplitude.

Preferably, there are at least two braking members disposed symmetrically about the said axis and being operative to engage said control surface in g-proportioned friction in both directions of movement.

There may be a resilient connection provided between said displaceable part and said braking member(s), which connection or spring is expediently adjusted to provide a preset force of frictional engagement of the brake members in the absence of any acceleration.

Optionally, said resilient connection or spring is adjusted to provide a preset force of frictional engagement of the brake members in the absence of any acceleration.

Preferably, said pendulum is constituted by a first pair of levers engaging weight means adjacent one end and being pivotally connected adjacent the other end to said brake members, a second pair of levers pivotally connected at one end thereof to said first pair of levers intermediate the said ends of the latter, the other ends of said second pair bearing against an adjustably biased spring carried on a boss which in turn is pivotally connected to said second pair of levers intermediate the ends of the latter and which includes a mounting pivot for the said device, the arrangement of said pairs of levers being symmetrical about a plane passing through said mounting pivot parallel to the axes of oscillation of the levers of said first pair.

Preferably, said first pair of levers engage in recesses in a housing constituting a pendulum weight.

The first pair of levers may each carry a weight adjacent one end.

The weights may face each other with a predetermined-sized gap therebetween into which then, preferably, extends a pillar connected to said boss so as to limit acceleration-induced angular movement towards said plane of one of the levers of said first pair.

In an expedient embodiment, said control member is a throttle lever or a throttle lever box of a rectilinearly activated aircraft throttle and said pendulum is mounted for oscillation about a horizontal axis so as to be sensitive to fore-and-aft accelerations.

Optionally, the control member is mounted on a supporting structure that includes a wheeled carriage mobile on rails.

Preferred embodiments of the invention will now be described, purely by way of example, with reference to the accompanying diagrammatic drawings, wherein.

Figure 1:
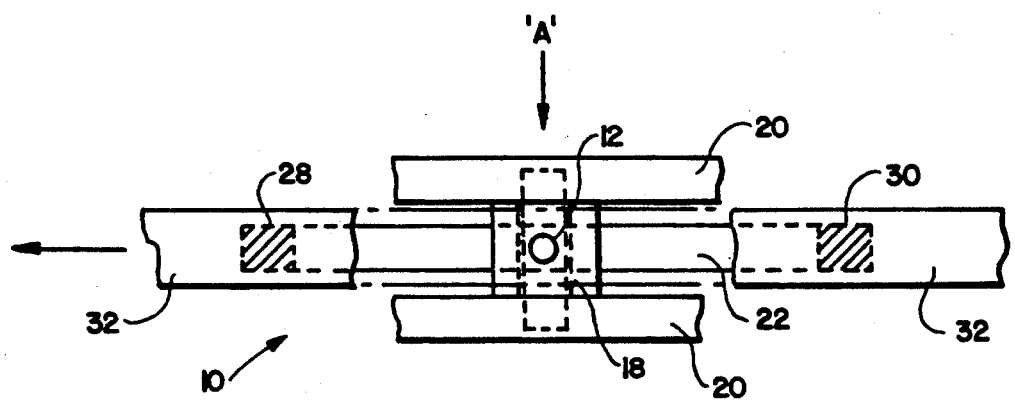
FIG. 1 is a plan view of a device according to a first embodiment of the invention.
Figure 2:
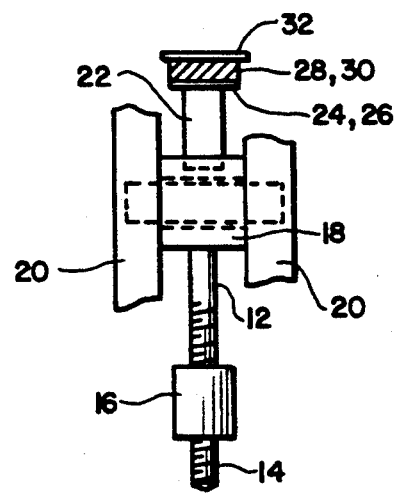
FIG. 2 is an end elevation of the device of FIG. 1.
Figure 3:
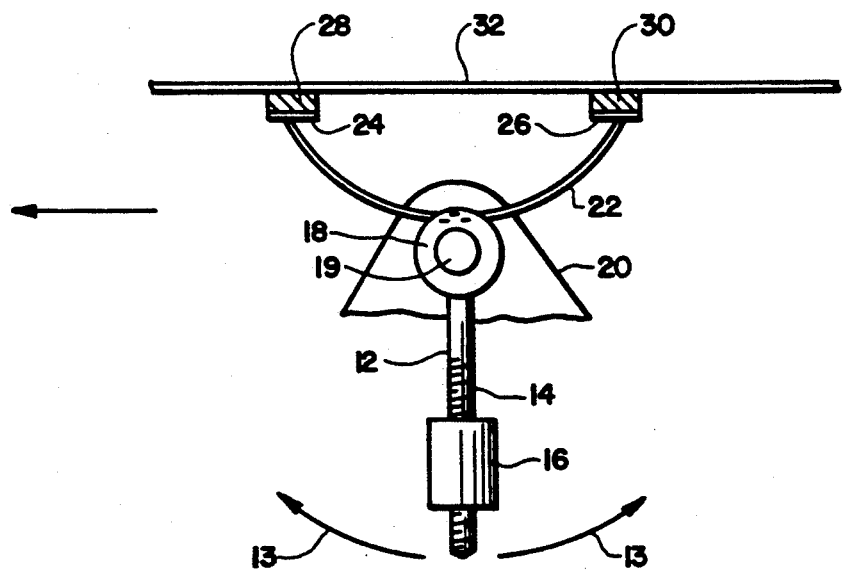
FIG. 3 is a cross-section of the device of FIG. 1, taken in the direction of the arrow 'A' in the latter.

Referring first to the embodiment of FIGS. 1 to 3, the device 10 comprises a pendulum 12 mounted for oscillation about a horizontal axis. It has a threaded stem 14 carrying a weight 16 adjustable along its length to balance the different masses of control handles (not shown) that may occur in practice.

The pendulum 12 is arranged to oscillate along the directions shown by curved arrows 13 on a suitable bush bearing assembly including the bearing 18 itself, which has an outer, displaceable part 20 which is a bifurcated end piece of a control handle in a throttle box (not shown). A spring 22, made, for example, of beryllium copper for strength, is accommodated in a groove in the bearing 18, the groove having a curvature which substantially follows that of the spring 22, and passing through the bearing 18 but not a member 19 referred to below. The two ends 24, 26 of the spring 22 are secured to respective friction pads 28, 30. The bearing assembly includes the member 19 which is a cylindrical member (FIG. 3) fixed to the bearing 18, and the bearing 18 rotates about the member 19. The friction pads 28, 30 constitute brake shoes that bear against a rubbing strip 32 on the side of the said throttle box with a certain bias or pre-load. The part 20 extends on each side of the rubbing strip 32, spring 22 and bearing 18. The said bias allows a certain basic friction 'feel' to the handle (not shown) when operated by a pilot and also provides sufficient hold of the handle to allow the pendulum acceleration under gravity ('g') to be greater than the 'g' acceleration of the handle. Movement of the pendulum 12 results in rotation of the bearing 18 about its axis axis and thus causes increased pressure to be applied to that one of the friction pads 28, 30 which is the leading shoe in whichever longitudinal direction the 'g' force is acting. The forward direction is indicated by a straight arrow in FIGS. 1 and 3.

Figure 4:
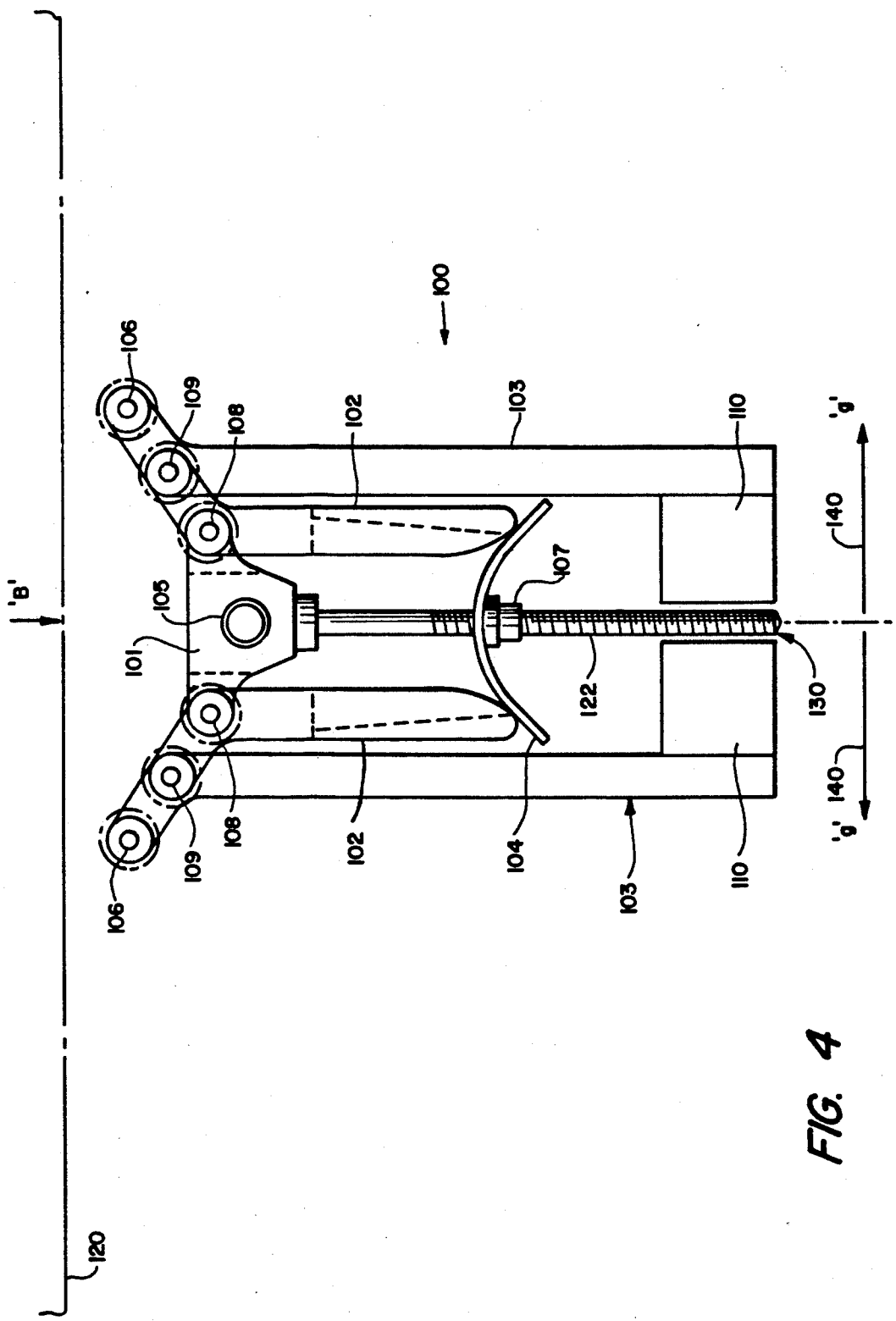
FIG. 4 is a side elevation of a second preferred embodiment of a device according to the invention.
Figure 6:
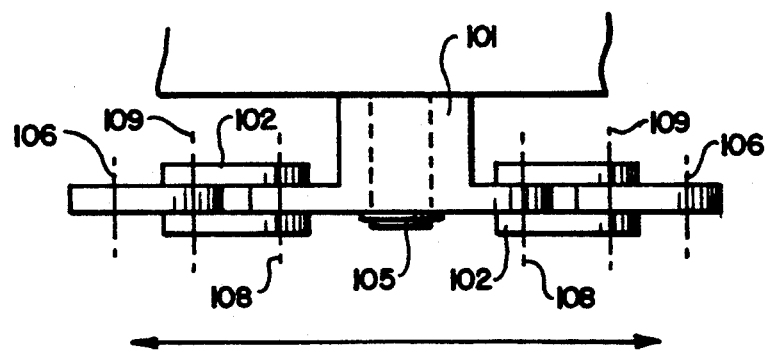
FIG. 6 is a plan view on arrow 'B' of FIG. 4.

Referring now to FIGS. 4 and 6 illustrating a more highly-developed embodiment of the invention, the 'g'-proportioned friction device 100 shown therein is mounted on a pivot 105 by way of a boss 101. This mode of mounting allows some angular movement about that point to ensure an even distribution of pressure on the two brake shoes (not shown) which are mounted on pivots 106. In operation, the brake shoes travel in a linear manner along a friction surface 120 when commanded to do so.

Basic friction is applied and adjusted by means of a nut 107 acting on a (preferably beryllium copper) spring 104. Screwing the nut 107 along its threaded pillar 122 towards pivot 105 increases basic friction and away from pivot 105 reduces it.

To increase basic friction, the bias of the spring 104 is applied to a respective pair of levers 102, each of which includes a bifurcated end portion that curves through approximately 45° at a pivot 108 located on the boss 101 (see FIG. 6) and then terminates in a connection to a further pivot 109. Thus the bias of the spring 104 causes the levers 102 to rotate slightly about pivot points 108 thus causing further pivot points 109 to be moved nearer to the friction surface 120, each lever and its pivot constituting a mechanical amplification device. Levers 103, being pivoted at pivot points 109, at which they curve through approximately 45° are also moved closer to the friction surface 120. As these levers 103 carry the non-illustrated brake shoes pivoted at points 106, it follows that pressure on the brake shoes will increase, consequently increasing the basic friction.

The application of longitudinal 'g' along the path of normal travel indicated by arrows 140 would cause uncommanded movement to whatever the device 100 is attached. To prevent this, the preset basic friction causes sufficient delay to enable the levers 103 to pivot about pivot points 109 (thus constituting respective mechanical amplification devices) under the influence of weights 110, thereby increasing the force on the leading shoe in proportion to the 'g' applied.

The pillar 122 of boss 101 to which the nut 107 is attached is carried through to extend into the gap 130 between the mutually facing weights 110, in order to prevent the lever 103 supporting the trailing shoe from pivoting substantially beyond the vertical: to allow it to do so would undesirably remove the basic friction from this trailing shoe.

Figure 5:
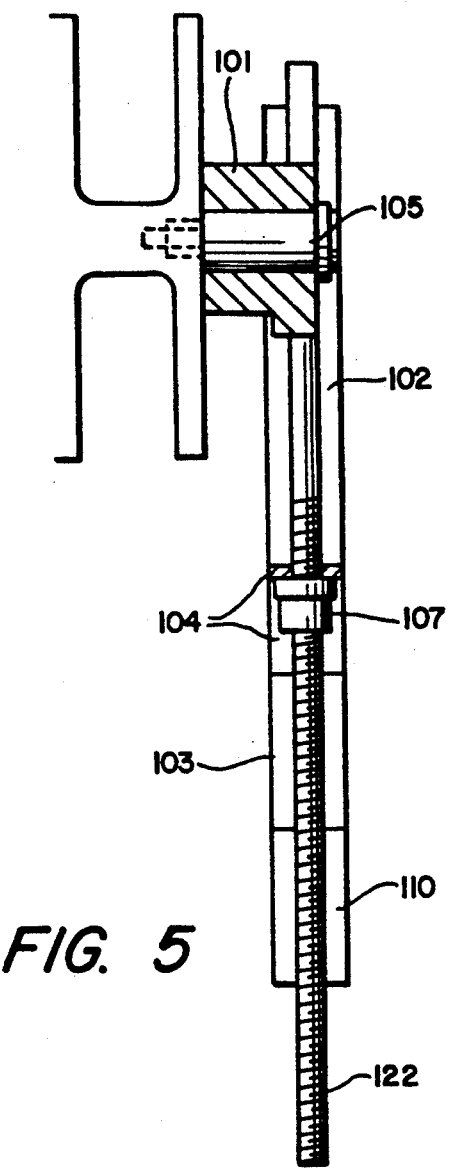
FIG. 5 is an end elevation of the device shown in FIG. 4.
Figure 7:
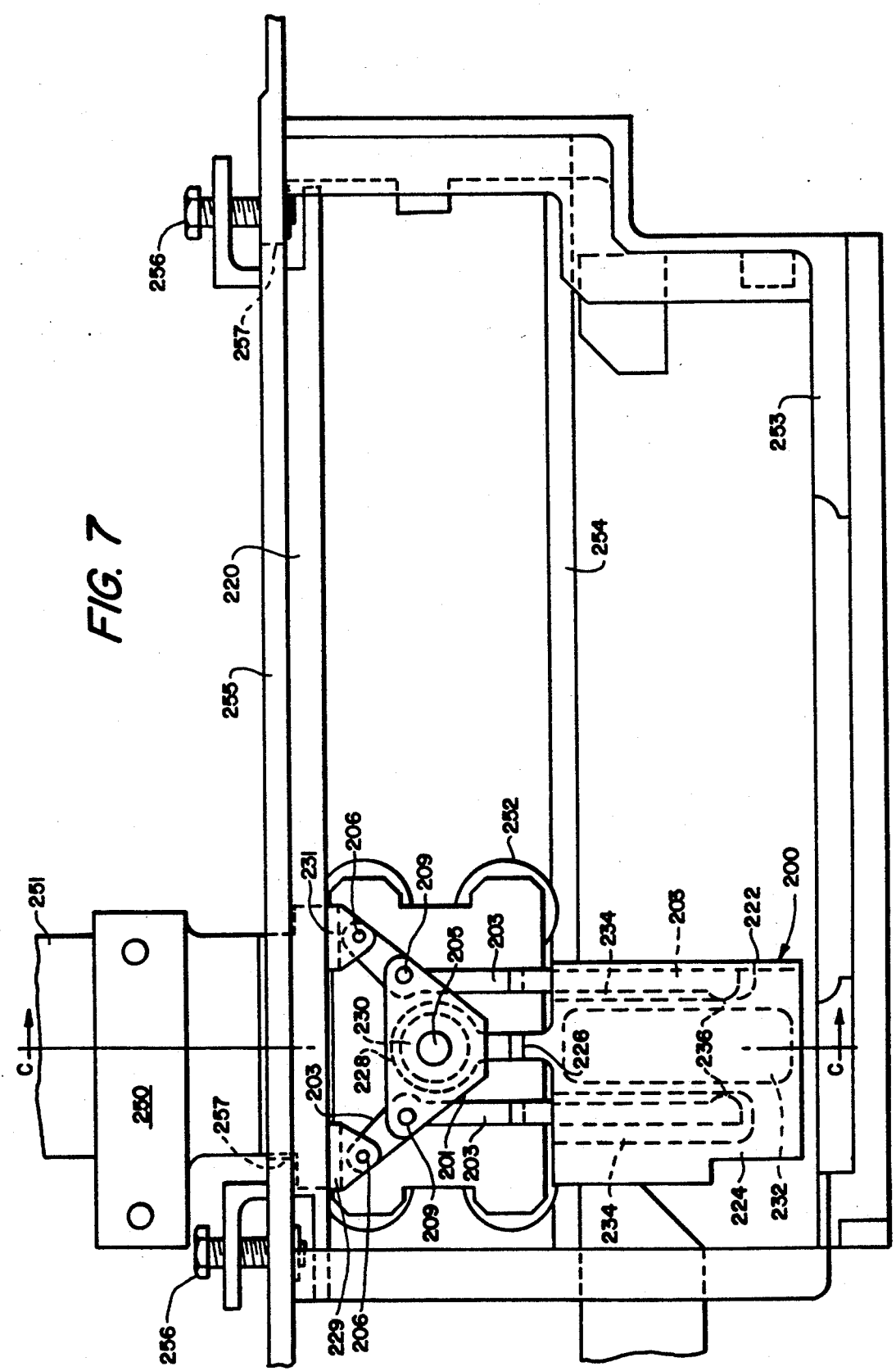
FIG. 7 is a side elevation of a device according to a third embodiment of the invention.
Figure 8:
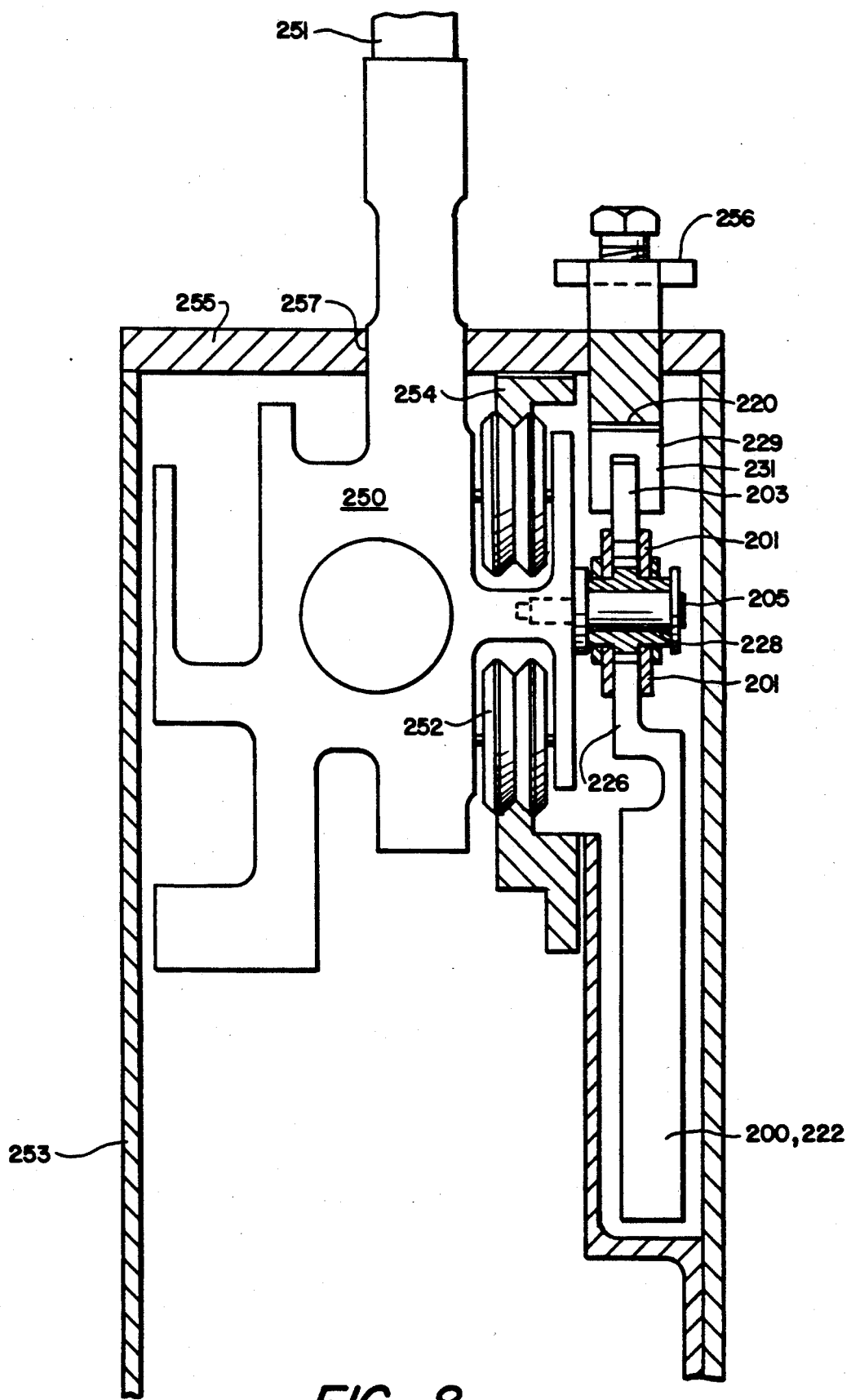
FIG. 8 is partly an end elevation of the device according to FIG. 7 and partly a cross-section taken along the line C—C in FIG. 7.

Turning now to the embodiment illustrated in FIGS. 7 and 8, wherein parts functionally similar to those of the embodiment illustrated in FIGS. 4 to 6 have been allotted reference numbers increased by 100, the 'g'-proportioned friction device 200 includes a horizontally mounted pendulum 222 having a main body portion 224, a neck 226 and a journal bearing 228. The bearing 228 surrounds an eccentric, internally splined bush 230 journalling a splined pin 205. The splined interconnection between the parts 205, 230 is for enabling the height of the pendulum to be adjusted.

The body portion 224 is hollow and its cavity is filled with a lead insert 232 to increase its mass. On either side of the lead insert 232 a respective recess 234 in the body portion 224 accommodates a lever 203. The free end portion of each lever 203 is formed with a nose 236 for frictional engagement with a wall of the respective recess 234.

Each lever 203 is pivotally connected by way of lever pivot pins 209 to two corners of a generally inverted triangular-section boss or plate 201 which surrounds the bearing arrangement 228, 230 and 205 of the pendulum. From pins 209 a further portion of each lever 203 extends at an angle and terminates in a pivotal connection 206 to friction pads 229, 231 bearing against a braking surface 220.

The bearing arrangement is connected to a carriage structure 250 that supports a throttle lever 251. This structure 250 runs on wheels 252 rolling on rails 254. The rails 254 and the braking surface 220 may be levelled by adjustable bolts 256. The lever 251 is secured for longitudinal movement in a throttle box 253 having a cover plate 255 with a longitudinal slot 257 to permit movement of the lever 251.

In this embodiment, no spring like the spring 104 in FIGS. 4 to 6 is provided. However, in a non-illustrated variant, an unrolled coil spring may be secured at each end of, and extending the full length of, the underside of the braking surface 220 and passed under the brake pads 229, 231 so as to exert a resilient force on the underside of the pads 229, 231.

In use of the embodiment of FIGS. 7 and 8, longitudinal, fore-and-aft acceleration causes the pendulum to oscillate, in turn causing the levers 203 to move up-and-down in the recesses 234. This lever movement is transmitted via lever pivot pins 209 and pivotal connections 206 to cause the appropriate one of the pads 229, 231 to be pressed more strongly against the braking surface 220.

Although in the embodiments of FIGS. 4 to 6 and FIGS. 7 and 8 the levers 103, 203 and friction pads are disposed symmetrically about the axis of oscillation of the pendulum, in a non-illustrated variant one lever or brake may operate in one direction in a 'g'-proportioned way but in the opposite direction may operate in a manner which is not 'g'-proportioned.

I claim:

1. An acceleration-sensitive friction device for damping undesired acceleration-induced movements of a control member, comprising:
   a bearing;
   a pendulum mounted for oscillation in said bearing about an axis so as to be bi-directionally sensitive to longitudinal 'g' forces;
   an element which is displaceable as a function of the amplitude of pendulum movement and which is one of: a part of said bearing, and a discrete part connected to said bearing;
   at least two braking members disposed one on each side of said axis; each braking member being:
   (i) connected to said element such that in use an increase in said amplitude is effective to vary the displacement of said element; and
   (ii) adapted frictionally to engage a surface of said control member with a frictional force, the magnitude of which is functionally related to the displacement of said element and thus to the increase, in either longitudinal direction, of said amplitude.

2. A friction device according to claim 1, wherein a resilient connection is provided between said displaceable part and said braking members.

3. A friction device according to claim 1, wherein a resilient connection is provided between said displaceable part and said braking members and said resilient connection is adjusted to provide a pre-set force of frictional engagement of the brake members in the absence of any acceleration.

4. A friction device according to claim 1, wherein said pendulum is constituted by a first pair of levers; weight means are engaged by said first pair of levers adjacent one end thereof and are pivotally connected adjacent the other end to said brake members; a second pair of levers are pivotally connected at one end thereof to said first pair of levers intermediate said ends of the latter; a boss; the other ends of said second pair of levers bearing against an adjustably biased spring carried on said boss; said boss being pivotally connected to said second pair of levers intermediate the ends of the latter; and a mounting pivot for said device; and
    wherein the arrangement of said first and second pairs of levers is symmetrical about a plane passing through said mounting pivot parallel to the axes of oscillation of the levers of said first pair.

5. A friction device according to claim 1, wherein said pendulum is constituted by a first pair of levers; weight means engaged by said first pair of levers adjacent one end thereof and being pivotally connected adjacent the other end to said brake members; a second pair of levers pivotally connected at one end thereof to said first pair of levers intermediate said ends of the latter; a boss; the other ends of said second pair of levers bearing against an adjustably biased spring carried on said boss; said boss being pivotally connected to said second pair of levers intermediate the ends of the latter; and a mounting pivot for said device;
    wherein the arrangement of said pairs of levers is symmetrical about a plane passing through said mounting pivot parallel to the axes of oscillation of the levers of said first pair; and
    wherein said first pair of levers engages in recesses in a housing constituting a pendulum weight.

6. A friction device according to claim 1, wherein said pendulum is constituted by a first pair of levers; weight means engaged by said first pair of levers adjacent one end thereof and being pivotally connected adjacent the other end to said brake members; a second pair of levers pivotally connected at one end thereof to said first pair of levers intermediate said ends of the latter; a boss; the other ends of said second pair bearing against an adjustably biased spring carried on said boss; said boss being pivotally connected to said second pair of levers intermediate the ends of the latter; and a mounting pivot for said device;
    wherein the arrangement of said first and second pairs of levers is symmetrical about a plane passing through said mounting pivot parallel to the axes of oscillation of the levers of said first pair; and
    wherein each lever of said first pair of levers carries a weight adjacent one end thereof.

7. A friction device according to claim 1, wherein said pendulum is constituted by a first pair of levers; weight means engaged by said first pair of levers adjacent one end thereof and being pivotally connected adjacent the other end to said brake members; a second pair of levers pivotally connected at one end thereof to said first pair of levers intermediate said ends of the latter; a boss; the other ends of said second pair bearing against an adjustably biased spring carried on said boss; said boss being pivotally connected to said second pair of levers intermediate the ends of the latter; and a mounting pivot for said device;
    wherein the arrangement of said first and second pairs of levers is symmetrical about a plane passing through said mounting pivot parallel to the axes of oscillation of the levers of said first pair;
    wherein each of said first pair of levers carries a weight adjacent one end thereof; and
    wherein said weights face each other with a predetermined gap therebetween into which extends a pillar connected to said boss so as to limit acceleration-induced angular movement towards said plane of one of the levers of said first pair of levers.

8. A friction device according to claim 1, wherein said control member is one of a throttle lever and a throttle lever box of a rectilinearly activated aircraft throttle and said pendulum is mounted for oscillation about a horizontal axis so as to be sensitive to fore-and-aft accelerations.

9. A friction device according to claim 1, wherein said pendulum is constituted by a first pair of levers; weight means engaged by said first pair of levers adjacent one end thereof and being pivotally connected adjacent the other end to said brake members; a second pair of levers pivotally connected at one end thereof to said first pair of levers intermediate said ends of the latter; a boss; the other ends of said second pair of levers bearing against an adjustably biased spring carried on said boss; said boss being pivotally connected to said second pair of levers intermediate the ends of the latter; and a mounting pivot for said device;
    wherein the arrangement of said first and second pairs of levers is symmetrical about a plane passing through said mounting pivot parallel to the axes of oscillation of the levers of said first pair; and
    wherein the control member is mounted on a supporting structure that includes a wheeled carriage mobile on rails.

10. A friction device according to claim 1, wherein a mechanical amplification device is connected between said element and said brake members.

11. A friction device according to claim 10, wherein said amplification device comprises a pivoted lever linkage.

12. A friction device for damping undesired acceleration-induced movements of a control member, comprising:
    a bearing;
    a pendulum mounted for oscillation in said bearing about a horizontal axis so as to be bi-directionally sensitive to longitudinal 'g' forces;
    an element which is displaceable as a function of the amplitude of pendulum movement and which is one of: a part of said bearing, and a discrete part connected to said bearing;
    at least two braking members disposed one on each side of said axis; each said braking member being:
    (i) connected to said element by way of a mechanical amplification device, said device being constituted by a pivoted lever linkage system; and
    (ii) adapted frictionally to engage a surface of said control member with a frictional force, the magnitude of which is functionally related to the displacement of said element and thus to the increase, in either longitudinal direction, of said amplitude.

13. An acceleration-sensitive friction device for damping undesired aceleration-induced movements of a control member, comprising:
- a bearing;
- a pendulum mounted for oscillation in said bearing in response to acceleration;
- an element which is displaceable as a function of an amplitude of pendulum movement and which is one of: a part of said bearing, and a discrete part connected to said bearing;
- at least one braking member connected to said element and adapted to frictionally engage a surface of said control member with a frictional force, the force having a magnitude which is functionally related to displacement of said element and thus to the increase of said amplitude.

14. An acceleration-sensitive friction device for damping undesired acceleration-induced movements of a control member, comprising:
- a bearing;
- a pendulum mounted for oscillation in said bearing about an axis so as to be bi-directionally sensitive to acceleration;
- an element which is displaceable as a function of an amplitude of pendulum movement and which is one of: a part of said bearing, and a discrete part connected to said bearing;
- at least two braking members disposed one each side of said axis; each braking member being:
  (i) connected to said element; and
  (ii) adapted to frictionally engage a surface of said control member with a frictional force, the force having a magnitude which is functionally related to displacement of said element and thus to the increase of said amplitude.

* * * * *